United States Patent
Yan et al.

(10) Patent No.: US 9,465,186 B2
(45) Date of Patent: Oct. 11, 2016

(54) LENS MODULE

(71) Applicants: Junjie Yan, Shenzhen (CN); Chuandong Wei, Shenzhen (CN); Chunhuan Fang, Shenzhen (CN); Lei Zhang, Shenzhen (CN)

(72) Inventors: Junjie Yan, Shenzhen (CN); Chuandong Wei, Shenzhen (CN); Chunhuan Fang, Shenzhen (CN); Lei Zhang, Shenzhen (CN)

(73) Assignee: AAC Acoustic Technologies (Shenzhen) Co. Ltd., Shenzhen (CN)

( * ) Notice: Subject to any disclaimer, the term of this patent is extended or adjusted under 35 U.S.C. 154(b) by 0 days.

(21) Appl. No.: 14/598,366

(22) Filed: Jan. 16, 2015

(65) Prior Publication Data
US 2015/0260945 A1    Sep. 17, 2015

(30) Foreign Application Priority Data
Mar. 14, 2014 (CN) .......................... 2014 2 0123746

(51) Int. Cl.
G02B 7/02 (2006.01)
G02B 7/00 (2006.01)
G02B 13/00 (2006.01)

(52) U.S. Cl.
CPC ............... *G02B 7/022* (2013.01); *G02B 7/003* (2013.01); *G02B 7/02* (2013.01); *G02B 7/021* (2013.01); *G02B 13/003* (2013.01)

(58) Field of Classification Search
CPC .................................. G02B 7/02; G02B 7/021
USPC ................................ 359/811, 819, 821, 830
See application file for complete search history.

(56) References Cited

U.S. PATENT DOCUMENTS 5,798,876 A * 8/1998 Nagano .................. G02B 7/021
                                                        359/819

* cited by examiner

*Primary Examiner* — William Choi
(74) *Attorney, Agent, or Firm* — Na Xu; IPro, PLLC

(57) ABSTRACT

Disclosed is lens module. The lens module includes a barrel and a lens group disposed in the barrel. The lens group includes a first lens element connecting with the barrel and a second lens element connecting with the first lens element. The first lens element connecting with the barrel makes the lens module have a first matching precision. The first matching precision makes the barrel and the lens group be concentric. The first lens element has a first arc surface and the second lens element has a second arc surface engaging with the first arc surface which makes the lens module have a second matching precision. The second matching precision makes the first lens element and the second lens element be concentric.

12 Claims, 4 Drawing Sheets

LENS MODULE

FIELD OF THE INVENTION

The disclosure described herein relates generally to a lens module.

DESCRIPTION OF RELATED ART

With the intelligence development of electronic devices, the electronic devices, like cameras, laptops, mobile phones, are all equipped with lens modules. People not only require the electronic devices have various functions, but also require a lens module capable of capturing image with high performance.

Related lens module usually comprises a barrel having a light hole and a lens group having at least two lens elements. Ideally, the optical axis of the lens group and a line passing through the geometrical center of the light hole should coincide with each other, that is, the barrel and the lens group should be concentric. Furthermore, the connection between the lens elements should also be very stable. However, due to the high sensitivity to the eccentricity, the concentricity and stability of the lens elements are hard to be guaranteed.

Therefore, an improved lens module is provided in the present disclosure to solve the problem mentioned above.

Figure 1:
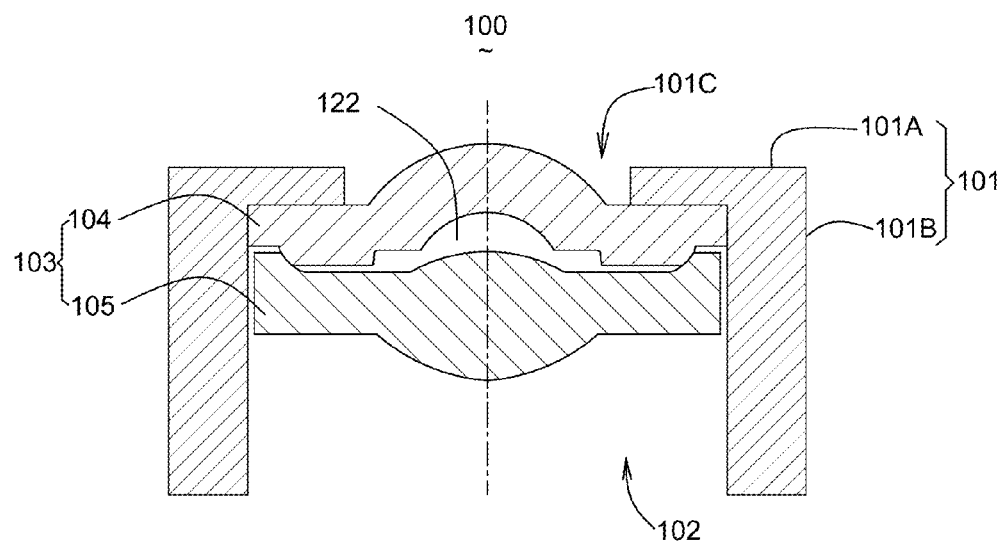
FIG. 1 illustrates a cross-sectional view of a lens module according with a first exemplary embodiment of the present disclosure.

Many aspects of the embodiments can be better understood with reference to the drawings mentioned above. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Reference will now be made to describe the exemplary embodiments of the present invention in detail.

Referring to FIG. 1, a lens module 100 comprises a barrel 101, and a lens group 103 disposed in the barrel 101 and connecting with the barrel 101.

The barrel 101 has a first sidewall 101A, a light hole 101C at the center of the first sidewall 101A, and a second sidewall 101B extending from the first sidewall 101A along a direction perpendicular to the first sidewall 101A. The first sidewall 101A and the second sidewall 101B unite to form a receiving room 102, and the light hole 101C communicates with the receiving room 102.

The lens group 103 comprises a first lens element 104 and a second lens element 105 connecting with the first lens element 104. The first lens element 104 has a first optical axis 106 and the second lens element 105 has a second optical axis 121.

Figure 2:
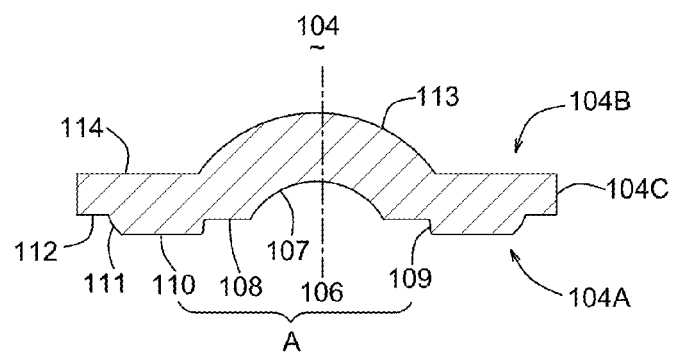
FIG. 2 illustrates a cross-sectional view of a first lens element of the lens module as shown in FIG. 1.

Referring to FIG. 2, the first lens element 104 has a first surface 104A opposite to the second lens element 105, a second surface 104B opposite to the first surface 104A and a side surface 104C connecting with the first surface 104A and the second surface 104B. The side surface 104C engages with an inner surface of the second sidewall 101B. The first surface 104A has a first portion A arranged in the middle of the first surface 104A and centered about the first optical axis 106, a first arc surface 111 extending from the periphery of the first portion A and a second portion 112 extending from the first arc surface 111 and away from the first portion A. The first portion A comprises a first optical surface 107 arranged in the middle of the first surface 104A and centered about the first optical axis 106, a first extending surface 108 extending from the periphery of the first optical surface 107 and away from the first optical axis 106, a connecting surface 109 bended along from and extending from the periphery of the first extending surface 108, and a second extending surface 110 extending from the periphery of the connecting surface 109 and away from the first optical axis 106. The second surface 104B has a second optical surface 113 at the center of the second surface 104B and centered about the first optical axis 106, and a third extending surface 114 extending from the periphery of the second optical surface 113 and engaging with the surface of the first sidewall 101A facing the receiving room 102. The fourth extending surface 114 engaging with the first sidewall 101A and the side surface 104C engaging with the second sidewall 101B make the lens module 100 have a first matching precision. The first matching precision is used for ensuring the barrel 101 is coaxial with the first lens element 104.

Figure 3:
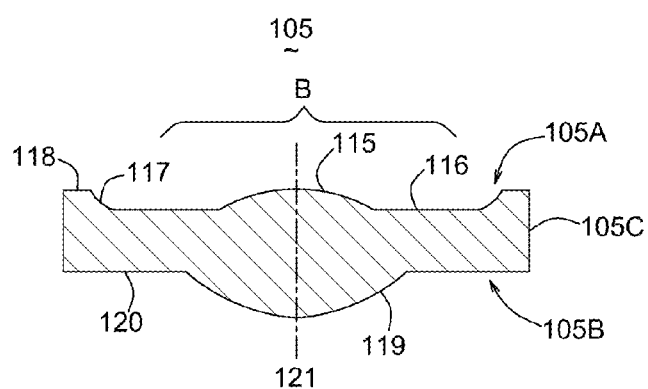
FIG. 3 is a cross-sectional view of a second lens element of the lens module as shown in FIG. 1.

Referring to FIG. 3, the second lens element 105 has an upper surface 105A near the first lens element 104, a lower surface 105B opposite to the upper surface 105A and a periphery surface 105C connecting with the upper surface 105A and the lower surface 105B. The periphery surface 105C keeps a predetermined distance from the second sidewall 101B. The upper surface 105A has a third portion B arranged in the middle of the upper surface 105A and centered about the second optical axis 121, a second arc surface 117 extending from the periphery of the third portion B and engaging with the first arc surface 111, and a fourth portion 118 extending from the periphery of the second arc surface 117 and away from the third portion B. The third portion B comprises a third optical surface 115 arranged in the middle of the upper surface 105A and centered about the second optical axis 121, and a first bearing surface 116 extending from the periphery of the third optical surface 115. The second arc surface 117 engages with the first arc surface 111 for forming a second matching precision of the lens module 100. The lower surface 105B has a fourth optical surface 119 at the center of the lower surface 105B and centered about the second optical axis 121, and a second bearing surface 120 extending from the periphery of the fourth optical surface 119. The second matching precision is used for ensuring the first lens element 104 is coaxial with the second lens element 105, that is, the first optical axis 106 is coincide with the second optical axis 121.

In the first embodiment, the first arc surface 111 and the second arc surface 117 are configured to be a part of a circle. Specifically, the first arc surface 111 is a convex arc surface, and the second arc surface 117 is correspondingly a concave arc surface. Optionally, the first arc surface could be a concave arc surface, the second arc surface is correspondingly a convex arc surface. Furthermore, the lens module 100 further has an air interval 122 formed by the first portion A and the third portion B. The air interval 122 is used for receiving a light filter. The thickness of the light filter should be smaller than that of the air interval 122, thereby the thickness tolerance of the light filter will not impact the matching precision between the first lens element 104 and the second lens element 105. Besides, the distance between the second bearing surface 118 and the third extending surface 112, and the distance between the periphery surface 105C and the second sidewall 101B ensure that the concentricity of the lens group 103 is determined solely by the engaging structure between the first arc surface 111 and the second arc surface 117, that is, the axiality tolerance of the barrel 101 does not impact the concentricity of the lens group 103.

The engaging structure between the first lens element 104 and the second lens element 105 ensures the first optical axis 106 and the second optical axis 121 are coincide with each other, and the engaging structures between the first lens element 104 and the barrel 101 ensure the center of the light hole 104C is located on the common optical axis of the first lens element 104 and the second lens element 105, thereby the concentricity between the barrel 101 and the lens group 103 is ensured.

Figure 4:
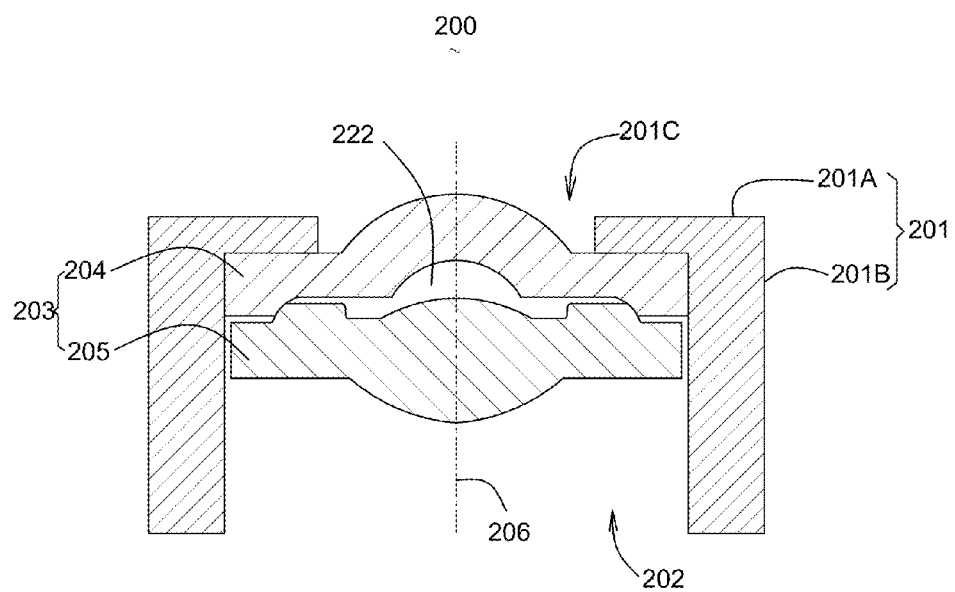
FIG. 4 is a cross-sectional view of a lens module according with a second exemplary embodiment of the present disclosure.

FIG. 4 illustrates the cross-sectional view of the second embodiment of the lens module according with the present disclosure. A lens module 200 comprises a barrel 201 and a lens group 203 disposed in the barrel 201 and connecting with the barrel 201.

The barrel 201 has a first sidewall 201A, a light hole 201C at the center of the first sidewall 201A, and a second sidewall 201B extending from the first sidewall along a direction perpendicular to the first sidewall 201A. The first sidewall 201A and the second sidewall 201B unite to form a receiving room 202, and the light hole 201C communicates with the receiving room 202.

The lens group 203 comprises a first lens element 204 and a second lens element 205 connecting with the first lens element 204. The first lens element 204 has a first optical axis 206 and the second lens element 205 has a second optical axis 221.

Figure 5:
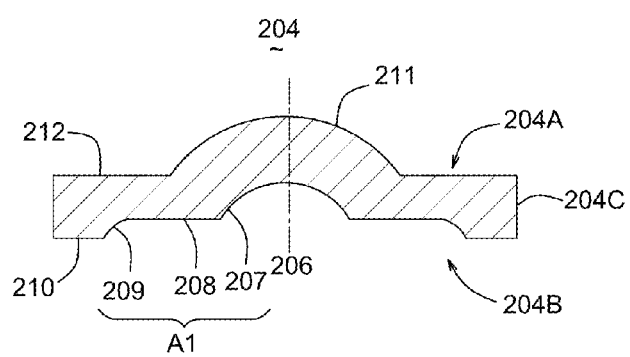
FIG. 5 is a cross-sectional view of a first lens element of the lens module as shown in FIG. 4.

Referring to FIG. 5, the first lens element 204 has a first surface 204A opposite to the second lens element 205, a second surface 204B opposite to the first surface 204A and a side surface 204C connecting with the first surface 204A and the second surface 204B. The side surface 204C engages with an inner surface of the second sidewall 201B. The first surface 204A has a first portion A1 arranged in the middle of the first surface, a first arc surface 209 extending from the periphery of the first portion A1 and a second portion 210 extending from the periphery of the first arc surface. The first portion A1 comprises a first optical surface 207 arranged in the middle of the first surface 204A and centered about the first optical axis 206, and a first extending surface 208 extending from the periphery of the first optical surface 207. The second surface 204B has a second optical surface 211 arranged in the middle of the second surface 204B and centered about the first optical axis 206, and a second extending surface 212 extending from the periphery of the second optical surface 211 and engaging with the first sidewall 201A. The second extending surface 212 engaging with the first sidewall 201A and the side surface 204C engaging with the second sidewall 201B make the lens module 200 have a first matching precision. The first matching precision is used for ensuring the barrel 201 is coaxial with the first lens element 204.

Figure 6:
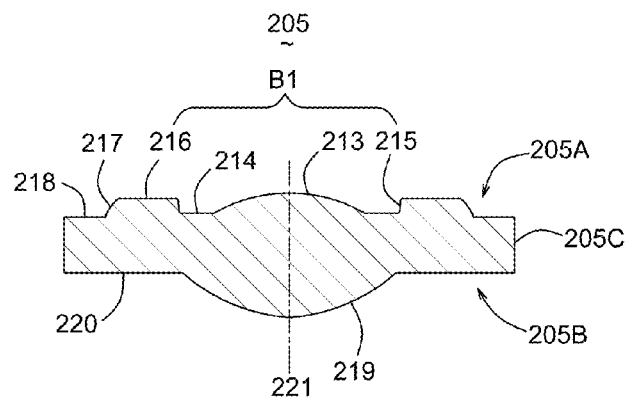
FIG. 6 is a cross-sectional view of a second lens element of the lens module as shown in FIG. 4.

Referring to FIG. 6, the second lens element 205 has an upper surface 205A near the first lens element 204, a lower surface 205B opposite to the upper surface 205A and a periphery surface 205C connecting with the upper surface 205A and the lower surface 205B. The periphery surface 205C keeps a predetermined distance from the first sidewall 201B. The upper surface 205A has a third portion B1 arranged in the middle of the upper surface 205A, a second arc surface 217 extending from the periphery of the third portion B1 and engaging with the first arc surface 209, and a fourth portion 218 extending from the periphery of the second arc surface 217. The third portion B1 comprises a third optical surface 213 arranged in the middle of the upper surface 205A and centered about the second optical axis 221, a first bearing surface 214 extending from the periphery of the third optical surface 213, a transition surface 215 bended from and extending from the periphery of the first bearing surface 214, and a second bearing surface 216 extending from the periphery of the transition surface 215. The second arc surface 217 engages with the first arc surface 209 for forming a second matching precision of the lens module 200. The lower surface 205B has a fourth optical surface 219 arranged in the middle of the lower surface 205B and centered about the second optical axis 221, and a third bearing surface 220 extending from the periphery of the fourth optical surface 219. The second matching precision is used for ensuring the first lens element 204 is coaxial with the second lens element 205, that is, the first optical axis 206 is coincide with the second optical axis 221.

In the second embodiment, the first arc surface 209 and the second arc surface 217 are configured to be a part of a circle. Specifically, the first arc surface 209 is a concave arc surface, the second arc surface 217 is correspondingly a convex arc surface. Optionally, the first arc surface could be a convex arc surface, the second arc surface is correspondingly a concave arc surface.

Furthermore, the lens module 200 further has an air interval 222 formed by the first portion A1 and the third portion B1. The air interval is used for receiving a light filter. The thickness of the light filter should be smaller than that of the air interval 222, thereby, the thickness tolerance of the light filter will not impact the matching precision between the first lens element 104 and the second lens element 105. Besides, the distance between the third bearing surface 218 and the second extending surface 210, and the distance between the periphery surface 205C and the second sidewall 201B ensure the concentricity of the lens group 203 is only decided by the engaging structure between the first arc surface 209 and the second arc surface 217, that is, the axiality tolerance of the barrel 201 does not impact the concentricity of the lens group 203.

The engaging structure between the first lens element 204 and the second lens element 205 ensures the first optical axis 206 and the second optical axis 221 are coincide with each other, and the engaging structures between the first element 204 and the barrel 201 ensure the center of the light hole 204C is located on the common optical axis of the first lens element 204 and the second lens element 205, thereby the concentricity between the barrel 201 and the lens group 203 is ensured.

Figure 7:
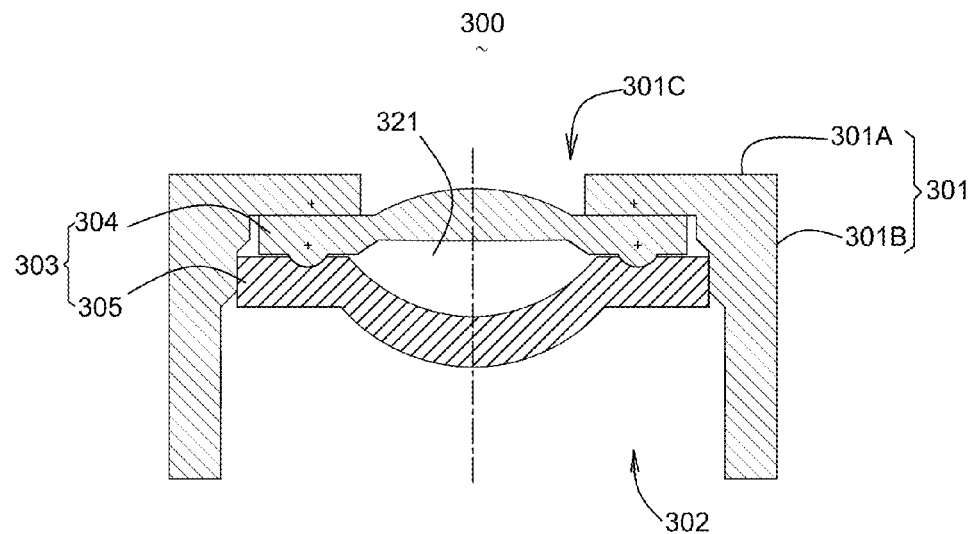
FIG. 7 is a cross-sectional view of a lens module according with a third exemplary embodiment of the present disclosure.

FIG. 7 illustrates the cross-sectional view of the third embodiment of the lens module according with the present disclosure. A lens module 300 comprises a barrel 301 and a lens group 303 disposed in the barrel 301 and connecting with the barrel 301.

The barrel 301 has a first sidewall 301A, a light hole 301C at the center of the first sidewall 301A, and a second sidewall 301B extending from the first sidewall along a direction perpendicular to the first sidewall 301A. The first sidewall 301A and the second sidewall 301B unite to form a receiving room 302, and the light hole 301C communicates with the receiving room 302.

The lens group 303 comprises a first lens element 304 and a second lens element 305 connecting with the first lens element 304. The first lens element 304 has a first optical axis 306 and the second lens element 305 has a second optical axis 320.

Figure 8:
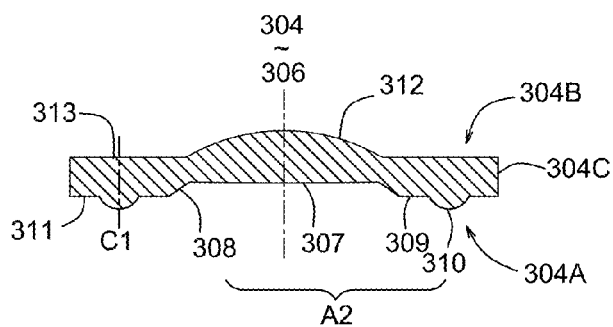
FIG. 8 is a cross-sectional view of a first lens element of the lens module as shown in FIG. 7.

Referring to FIG. 8, the first lens element 304 has a first surface 304A opposite to the second lens element 305, a second surface 304B opposite to the first surface 304A and a side surface 304C connecting with the first surface 304A and the second surface 304B. The side surface 304C keeps a predetermined distance from the second sidewall 301B. The first surface 304A has a first portion A2 arranged in the middle of the first surface 304A, a first arc surface 310 extending from the periphery of the first portion A2 and a second portion 311 extending from the periphery of the first arc surface 310. The first portion A2 comprises a first optical surface 307 arranged in the middle of the first surface 304A and centered about the first optical axis 306, a transition surface 308 bended from and extending from the periphery of the first optical surface 307, and a first extending surface 309 extending from the periphery of the transition surface 308. The second surface 304B has a second optical surface 312 arranged in the middle of the second surface 304B and centered about the first optical axis 306, and a second extending surface 313 extending from the periphery of the second optical surface 312 and engaging with the first sidewall 301A. The second extending surface 313 engaging with the first sidewall 301A and the side surface 304C engaging with the second sidewall 301B make the lens module 300 have a first matching precision. The first matching precision is used for ensuring the barrel 301 is coaxial with the first lens element 304.

Figure 9:
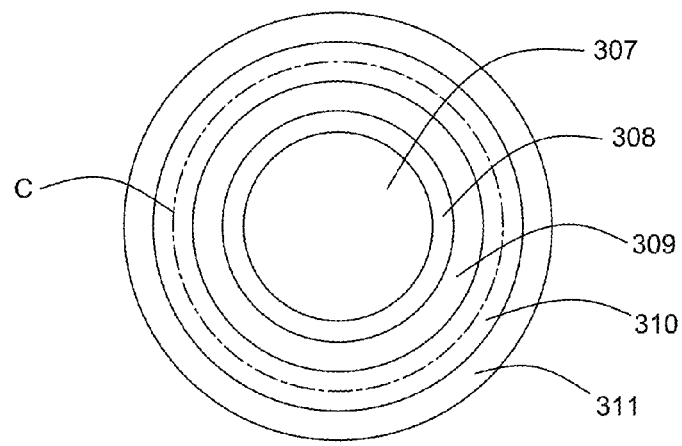
FIG. 9 is a bottom view of the first lens element of the lens module as shown in FIG. 8.

Referring to FIG. 9, the second lens element 305 has an upper surface 305A near the first lens element 304, a lower surface 305B opposite to the upper surface 305A and a periphery surface 305C connecting with the upper surface 305A and the lower surface 305B. The periphery surface 305C engages with the first sidewall 301B. The upper surface 305A has a third portion B2 arranged in the middle of the upper surface 305A, a second arc surface 316 extending from the periphery of the third portion B2 and engaging with the first arc surface 310, and a fourth portion 317 extending from the periphery of the second arc surface 316. The third portion B2 comprises a third optical surface 314 arranged in the middle of the upper surface 305A and centered about the second optical axis 320, and a first bearing surface 315 extending from the periphery of the third optical surface 314. The second arc surface 316 engages with the first arc surface 310 for forming a second matching precision of the lens module 300. The lower surface 305B has a fourth optical surface 318 arranged in the middle of the lower surface 305B and centered about the second optical axis 320, and a second bearing surface 319 extending from the periphery of the fourth optical surface 318. The second matching precision is used for ensuring the first lens element 304 is coaxial with the second lens element 305, that is, the first optical axis 306 is coincide with the second optical axis 320.

Figure 10:
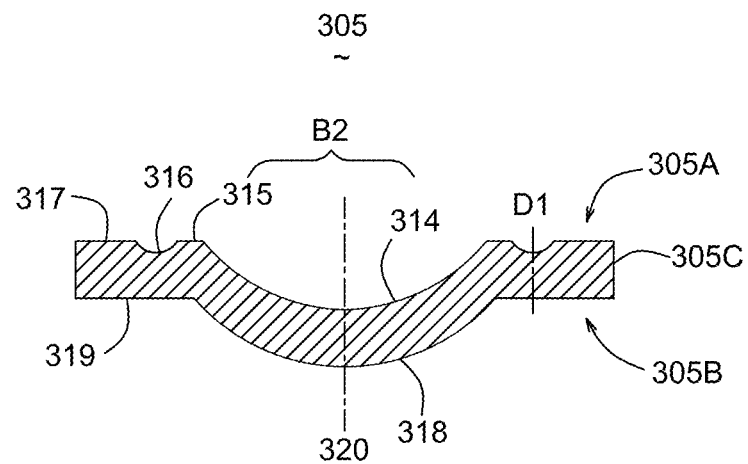
FIG. 10 is a cross-sectional view of a second lens element of the lens module as shown in FIG. 7.
Figure 11:
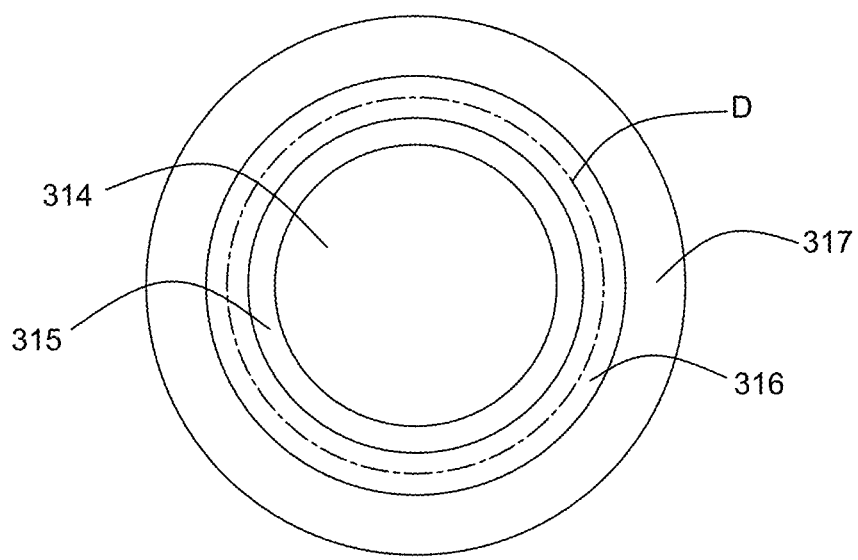
FIG. 11 is a vertical view of the second lens element of the lens module as shown in FIG. 10.

In this embodiment, the first arc surface 310 has a continuous line C that furthest from the second surface 304B. Referring to FIG. 9, the continuous line C is formed by the lowest points of the first arc surface 310, and the continuous line C is a closed circle. Referring back to FIG. 8, take the cross-sectional view of the first arc surface 310 on the left for example, the cross-sectional view of the first arc surface 310 on the left is symmetrical about line C1. Referring to FIGS. 10-11, the second arc surface 316 has a continuous line D that furthest from the upper surface 305A. The continuous line D is formed by the lowest points on the second arc surface 316, and the continuous line D is a circle. Take the cross-sectional view of the second arc surface 316 on the right for example, the cross-sectional view of the second arc surface 316 on the right is symmetrical about the line D1. Optionally, the first arc surface 310 and the second arc surface 316 could be a discontinuous arc surface.

Furthermore, the lens module 300 further has an air interval 321 formed by the first portion A2 and the third portion B2. The air interval 321 is used for receiving a light filter. The thickness of the light filter should be smaller than that of the air interval 321, thereby, the thickness tolerance of the light filter will not impact the matching precision between the first lens element 304 and the second lens element 305. Besides, the distance between the second extending surface 311 and the second bearing surface 317, and the distance between the side surface 304C and the second sidewall 301B ensure the concentricity of the lens group 303 is only decided by the engaging structure between the first arc surface 310 and the second arc surface 316, that is, the axiality tolerance of the barrel 301 does not impact the concentricity of the lens group 303.

The engaging structure between the first lens element 304 and the second lens element 305 ensures the first optical axis 306 and the second optical axis 320 are coincide with each other, and the engaging structures between the first element 304 and the barrel 301 ensure the center of the light hole 304C is located on the common optical axis of the first lens element 304 and the second lens element 305, thereby the concentricity between the barrel 301 and the lens group 303 is ensured.

While the present disclosure has been described with reference to the specific embodiment, the description of the disclosure is illustrative and is not to be construed as limiting the disclosure. Various of modifications to the present disclosure can be made to the exemplary embodiment by those skilled in the art without departing from the true spirit and scope of the disclosure as defined by the appended claims.

What is claimed is:

1. A lens module, comprising:
    a barrel having a first sidewall, a light hole in the center of the first sidewall, a second sidewall extending from the first sidewall and a receiving room formed by the first sidewall and the second sidewall;
    a first lens element disposed in the receiving room and connecting with the barrel for making the lens module have a first matching precision, the first lens having a first optical axis, a first surface, a second surface opposite to the first surface and partially engaging with the first sidewall, and a side surface connecting with the first surface and the second surface, the side surface engaging with the second sidewall, the first surface having a first portion arranged in the middle of the first surface, a first arc surface extending from the periphery of the first portion and a second portion extending from the periphery of the first arc surface;

a second lens element disposed in the receiving room and connecting with the first lens element for making the lens module have a second matching precision, the second lens element having a second optical axis, an upper surface near the first lens element, a lower surface opposite to the upper surface and a periphery surface connecting with the upper surface and the lower surface, the periphery surface keeping a distance with the second sidewall, the upper surface having a third portion arranged in the middle of the upper surface and centered about the second optical axis, a second arc surface extending from the periphery of the third portion and engaging with the first arc surface, and a fourth portion extending from the periphery of the second arc surface;

the first portion keeping a predetermined distance from the third portion and the second portion keeping a predetermined distance from the fourth portion, the second matching precision making the first optical axis and the second optical axis coincide with each other and the first matching precision making the center of the light hole be located on the optical axis of the first lens element and the second lens element.

2. The lens module as described in claim 1, wherein the first portion comprises a first optical surface arranged in the middle of the first surface and centered about the first optical axis, a first extending surface extending from the periphery of the first optical surface, a connecting surface bended along from and extending from the periphery of the first extending surface, and a second extending surface extending from the periphery of the connecting surface.

3. The lens module as described in claim 2, wherein, the second surface has a second optical surface arranged in the middle of the second surface and centered about the first optical axis, and a third extending surface extending from the periphery of the second optical surface and engaging with the first sidewall.

4. The lens module as described in claim 3, wherein the third portion comprising a third optical surface arranged in the middle of the upper surface and centered about the second optical axis, and a first bearing surface extending from the third optical surface.

5. The lens module as described in claim 1, wherein the first portion comprises a first optical surface arranged in the middle of the first surface and centered about the optical axis and a first extending surface extending from the periphery of the first optical surface.

6. The lens module as described in claim 5, wherein the second surface comprises a second optical surface arranged in the middle of the second surface and centered about the first optical axis, and a second extending surface extending from the periphery of the second optical surface and engaging with the first sidewall.

7. The lens module as described in claim 6, wherein the third portion comprises a third optical surface arranged in the middle of the upper surface and centered about the second optical axis, a first bearing surface extending from the periphery of the third optical surface, a transition surface bended from and extending from the periphery of the first bearing surface, and a second bearing surface extending from the periphery of the transition surface.

8. The lens module as described in claim 7, wherein the first lens elements further comprises a side surface connecting with the first surface and the second surface, the side surface engages with the second sidewall, the second lens elements further comprises a periphery surface connecting with the upper surface and the lower surface, the periphery surface keeps a distance with the second sidewall.

9. The lens module as described in claim 1, wherein the first portion comprises a first optical surface arranged in the middle of the first surface and centered about the first optical axis, a transition surface bended from and extending from the periphery of the first optical surface, and a first extending surface extending from the periphery of the transition surface.

10. The lens module as described in claim 9, wherein the second surface has a second optical surface arranged in the middle of the second surface and centered about the optical axis, and a second extending surface extending from the periphery of the second optical surface and engaging with the first sidewall.

11. The lens module as described in claim 10, wherein the third portion comprising a third optical surface arranged in the middle of the upper surface and centered about the second optical axis, and a first bearing surface extending from the third optical surface.

12. The lens module as described in claim 1 further comprising a light filter disposed between the first portion and the third portion.

* * * * *